United States Patent Office 3,009,264
Patented Nov. 21, 1961

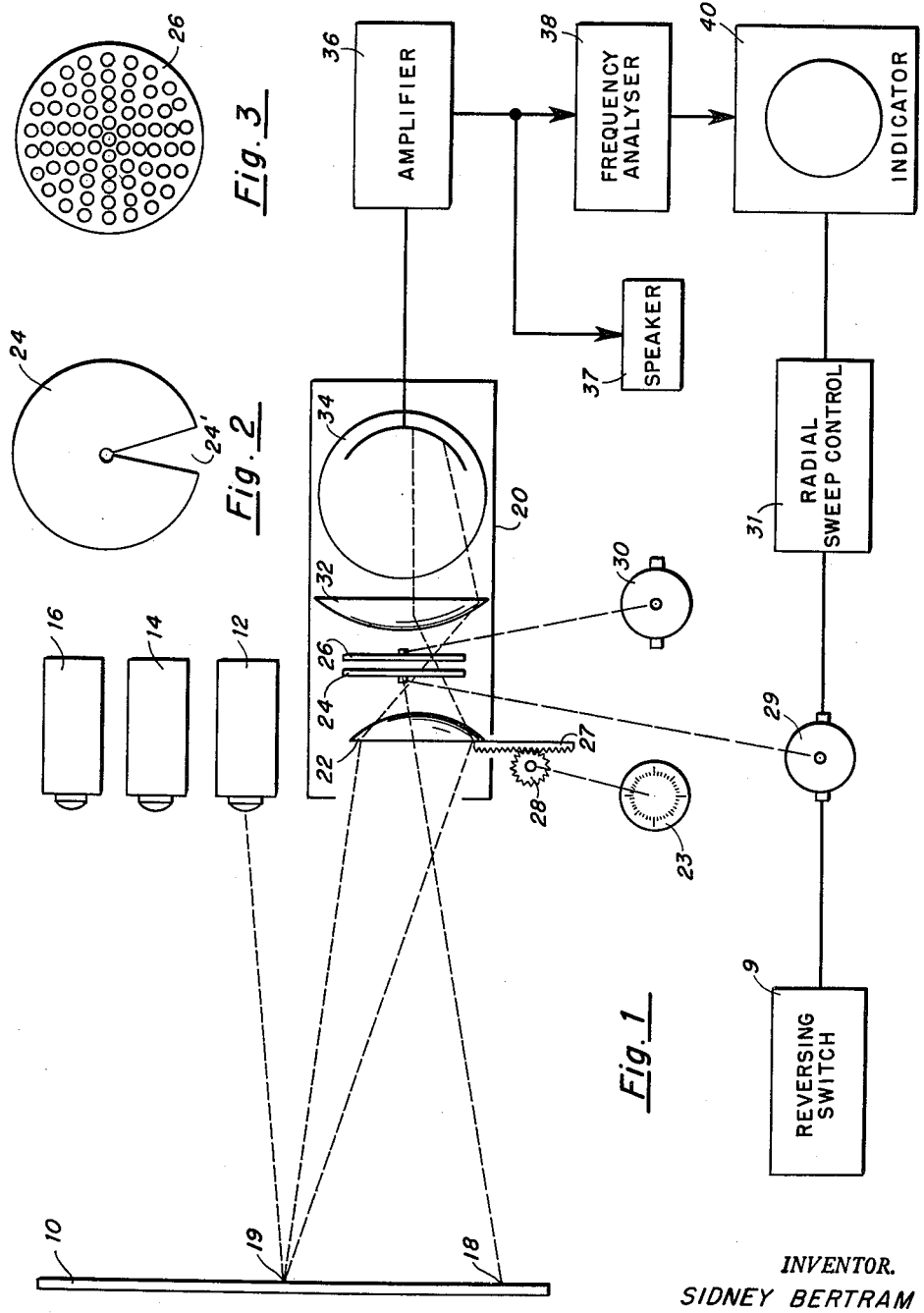

3,009,264
SIMULATOR FOR ECHO RANGING
Sidney Bertram, Los Angeles, Calif., assignor to the United States of America as represented by the Secretary of the Navy
Filed Dec. 9, 1953, Ser. No. 397,283
3 Claims. (Cl. 35—10.4)

This invention relates to a simulator for echo-ranging.

It is an object of this invention to provide an echo-ranging simulator which utilizes optical means to translate target indications into echo information.

It is a further object of this invention to provide a simulator which simulates the bearing and range of a target relative to own ship, and which provides means for changing the range and bearing of the target relative to own ship.

It is still a further object of this invention to provide an echo-ranging simulator which provides a plan position indication and audio signal for simulating the presence of one or more targets relative to own ship.

Other objects and many of the attendant advantages of this invention will be readily appreciated as the same becomes better understood by reference to the following detailed description when considered in connection with the accompanying drawings wherein:

FIG. 1 is a schematic representation of an embodiment of the invention;

FIG. 2 illustrates the sector scanning disc; and

FIG. 3 illustrates the perforated disc.

In standard FM sonar, a sending transducer operates continuously but with its oscillation frequency rising at a uniform rate. An echo will also be continuous and will similarly rise in frequency. The received echo is beat against the transmission frequency, which has been rising continually during the transit time of the echo. The resulting difference frequency is then proportional to the range of the target, and is independent of the actual operating frequencies. The transmitting transducer radiates into a wide sector. The receiving transducer is sharply directional so that it receives echoes from only a small sector. It is rotated continuously but the operator can reverse the direction of scan at will so as to concentrate on any sector. The target information is presented as a P.P.I. (plan-position-indication) on a cathode-ray screen. The beam of the tube sweeps radially out from the center, the direction of sweep corresponding to the direction the receiving transducer is pointed. The difference signal, the frequency of which serves as the measure of the range of the target, is passed through an analyzer which in turn controls the cathode ray indicator to produce spots of light at distances from the center of the screen that are proportional to these frequencies. The specific construction of the analyzer is unimportant here. It is sufficient that a tone of a given frequency, when impressed on the analyzer, will cause a spot of light to appear at a corresponding distance from the center of the P.P.I. screen.

In the present invention means are provided for generating synthetic "difference-signals" in conjunction with a means for simulating the scanning action of a receiving transducer. The simulating means of the scanning action is synchronized with the radical sweep control of a standard P.P.I. indicator and the synthetic difference-signals are applied through standard amplifiers and a frequency analyzer to a P.P.I. indicator and also to a speaker whereby the range and bearing of the target relative to own-ship are very realistically simulated.

In the accompanying drawing, a plurality of targets are represented in plan by spots of light projected onto screen 10 which is otherwise dark. A single target 19 or a number of targets fixed relative to one another may be projected by a single projector 12, but targets movable relative to one another are preferably simulated by separate projectors 14 and 16.

A housing 20 contains an objective lens 22 that focuses an image of the pattern of spots of light at screen 10 onto two rotatable discs 24 and 26. The spot 18 on the screen whose image point lies at the axis of these discs is the position of "own-ship" in the plan of the problem. No means are shown here for illuminating or otherwise marking the point 18, nor is such indicating means necessary or desirable, since the point 18 is merely an imaginary point. As is conventional in P.P.I. presentation, the "own-ship" position is at the geometric center of the screen. The target position would be indicated when a high beam is passed through the center aperture of rotatable discs 24 and 26 and thereby impinging upon the photoelectric cell 34 through lens 32. It is thus seen that the "own-ship" position 18 on screen 10 will be that point from which a beam of light would pass as set out above. It is further seen that as the relative position of lens 22 and screen 10 is varied, the position of the "own-ship" point is also varied. Movement of "own-ship" is simulated by moving the objective lens 22 by manually rotating control knob 23 so as to move spot 18 and thereby, at the same time, move the images of the target spots 19 on the faces of discs 24 and 26. While the present arrangement shows only a rack 27 and pinion 28 connected to the control knob 23 for movement of the lens 22 along one line, it will be obvious to those skilled in the art that other mechanical movement means might be provided for movement of the lens 22 in any lateral direction in its plane.

The first disc 24 is opaque except for a narrow sector 24' that simulates the narrow sector from which the receiving transducer can receive echoes. To this end scanning disc 24 is rotated by reversible scanning motor 29 which also drives the control 31 for the radial sweep of the indicator 40 just as is done in standard FM sonar gear. Those target images that fall within the sector 24' of disc 24 are chopped by a perforated disc 26, which is driven at a constant speed by constant speed motor 30. The number of perforations in each circle is proportional to its diameter so that the frequency at which the beam is chopped is proportional to its distance from the axis of the disc, that is proportional to the range of the target from "own-ship."

This chopped echo frequency corresponds realistically to the "difference frequency" in actual FM sonar. For example, a target extended in range, such as a bow-on-submarine, will produce a mixed tone in FM sonar. Here its image will fall on two or more rows of holes in disc 26 to produce a similar mixed tone. The beam of light is collected by lens 32 and directed onto photoelectric cell 34, the output of which is amplified at 36. The electrical output of this amplifier drives the speaker 37, frequency analyzer 38, and indicator 40, all of which are elements of standard FM sonar gear. Since the amplifier 36, speaker 37, frequency analyzer 38, radial sweep control 31, and indicator 40 are of standard construction and known to those skilled in the art, they will not be further described in this application.

Obviously many modifications and variations of the present invention are possible in the light of the above teachings. It is therefore to be understood that within the scope of the appended claims the invention may be practiced otherwise than as specifically described.

What is claimed is:

1. A target range and bearing simulator comprising a reflecting surface, means for projecting a movable light beam onto said surface, a perforated rotatable disc spaced from said reflecting surface and rotatable in a plane substantially parallel with the plane of said reflecting surface, constant speed means for rotating said perforated disc, a photoelectric cell in spaced relation to said reflecting surface and spaced beyond said perforated disc, lens means for focusing the reflected beam from said projecting means onto said perforated disc, means for focusing the reflected beam after it passes through said perforated disc onto said photoelectric cell, scanning means between said reflecting surface and said photoelectric cell, means for driving said scanning means, a radial sweep target range and bearing indicator, a frequency analyzer, means for amplifying and applying to said frequency analyzer the signal generated by said photoelectric cell in response to said reflected light beam, said frequency analyzer being operably connected to said target indicator, said frequency analyzer and target indicator being operable to translate said amplified signal into range of a target simulated by said light beam, a radial sweep control operably connected to said target indicator, means operably connecting said scanning driving means and radial sweep control, said radial sweep control being movable responsive to movement of said scanning drive and scanning means to thereby indicate on said target indicator the bearing of a target simulated by said light beam, and means for varying the position of said lens means to thereby vary the point of application of the light beam on said perforated disc to simulate own ship's motion.

2. A simulator as defined in claim 1 wherein there is further provided a speaker operably connected to said signal amplifying means, to thereby give an aural indication of the range of said target.

3. A simulator as defined in claim 1 wherein there are provided a plurality of said light beam projecting means.

References Cited in the file of this patent

UNITED STATES PATENTS

| | | |
|---|---|---|
| 2,422,697 | Meacham | June 24, 1947 |
| 2,468,042 | Cranberg | Apr. 26, 1949 |
| 2,528,142 | Herzlinger | Oct. 31, 1950 |
| 2,652,636 | Garman | Sept. 22, 1953 |
| 2,697,822 | Schuck et al. | Dec. 21, 1954 |
| 2,720,712 | Brettell | Oct. 18, 1955 |
| 2,820,906 | Miller | Jan. 21, 1958 |